April 18, 1961   J. A. THOMPSON   2,979,820
SKINNING KNIFE
Filed Sept. 21, 1959

JOHN A. THOMPSON
INVENTOR.
BY *Herbert J. Brown*
ATTORNEY

United States Patent Office 2,979,820
Patented Apr. 18, 1961

2,979,820
SKINNING KNIFE

John A. Thompson, Fort Worth, Tex., assignor to Russell Harrington Cutlery Company, Southbridge, Mass., a corporation of Massachusetts Filed Sept. 21, 1959, Ser. No. 841,204

2 Claims. (Cl. 30—215)

This invention relates to skinning knives such as those used in meat packing plants for removing skins from slaughtered animals, and has reference to an improved rotary knife construction for cutting the connective or subcutaneous layer of skin which exists between the hide and the muscular tissue.

An object of the invention is to provide a rotary skinning knife having a relatively flat tapered head without projections and whereby hides may be removed from muscular tissue without damage to either.

A particular object of the invention is to provide a motor driven skinning knife which may be conveniently opened and closed for lubricating the mechanism thereof.

Another object of the invention is to provide a skinning knife having counter-oscillating circular blades in sliding contact with each other, yet which blades will not vibrate due to wear therebetween.

A further object is to provide a skinning knife of the described class which has relatively few parts, yet one which is smooth and efficient in its operation.

These and other objects will become apparent from the following description and accompanying drawing, wherein.

Figure 2:
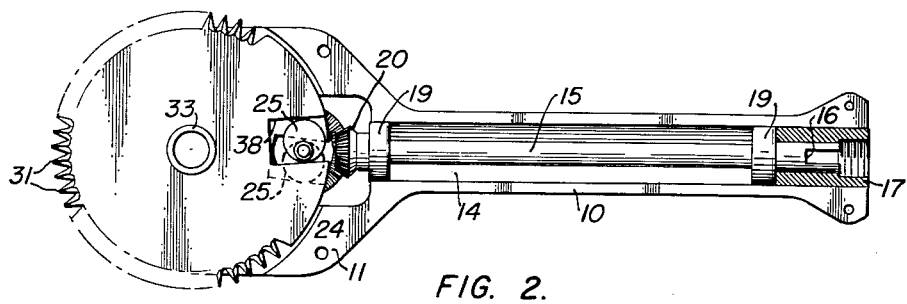
Figure 2 is a plan view of the knife illustrated in Figure 1 and showing one-half of the head and handle removed.
Figure 1:
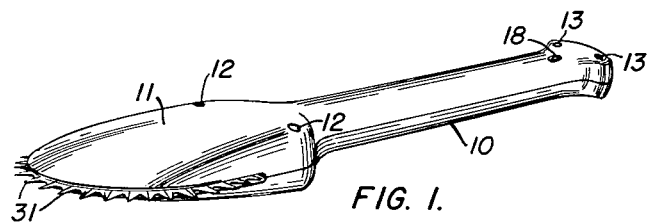
Figure 1 is a perspective view of a skinning knife embodying the features of the invention.

The form of the invention shown is comprised of two substantially identical halves each having a rounded handle portion 10 integral with a forwardly tapered and rounded head portion 11, which halves are secured to each other by recessed headed screws 12 in opposite sides of the head and similar screws 13 at the outer end of the handle. The handle portion 10 is hollow, as at 14, and receives a drive shaft 15 therethrough. The outer end of the drive shaft 15 is slotted, as at 16, for engagement with a driven flexible shaft, not shown. As shown in Figure 2, the referred to slotted end of the shaft 15 is received in a flexible shaft coupling 17, and which coupling is demountably secured in the handle by means of a recessed screw 18 (Figure 1). Within the handle portion 10, and near each end of the drive shaft 15 there are ball bearings 19, and mounted on the inner end of the drive shaft there is a bevel gear 20.

Figure 4:
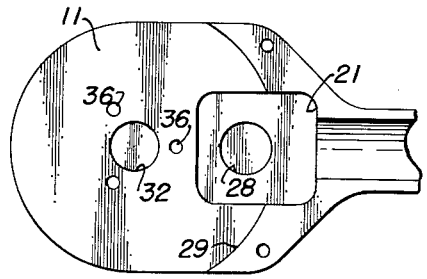
Figure 4 is a broken plan view of one-half of the head with all operating parts removed.
Figure 6:
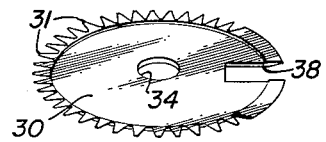
Figure 6 is a perspective view of one of the knife blades.

Referring now particularly to Figure 4, opposite sides of the head 11 are recessed, as at 21, to receive the bevel gear 20 and the double cam drive unit 22 which is comprised of a transverse shaft 23, a driven bevel gear 24 thereon which engages the first described bevel gear 20, and disc cams 25 oppositely mounted on and in side by side relation on said transverse shaft. The outer ends of the transverse shaft 23 are of reduced diameter, as at 26, for engaging the inner recesses of ball bearings 27 mounted in circular recesses 28 within the first described recesses 21.

Figure 3:
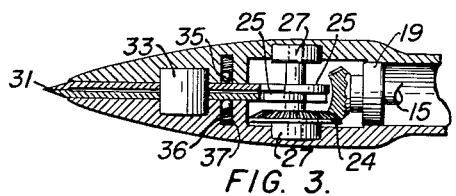
Figure 3 is a transverse broken section of the assembled head showing the arrangement of components therein.
Figure 5:
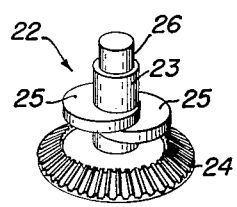
Figure 5 is an enlarged perspective view of the double cam unit which oscillates the circular knife blades.

Opposing halves of the head 11 are arcuately recessed near the handle portions 10, as at 29, for receiving a pair of toothed or serrated circular knife blades 30. The forward end of the head 11 is arcuate and, when the knife is assembled, is positioned just inwardly of the knife blade teeth 31, whereas the arcuate recesses 29 in the halves of the head 11 are positioned outwardly of the blade teeth. The radial center of each arcuate recess 29 is provided with aligned circular recesses 32 for receiving the ends of a tubular knife blade bushing 33. The center of each blade 30 is provided with an axial opening 34 for engaging the bushing 33, and which blades are in sliding contact with each other. As particularly shown in Figure 3, the outer surfaces of the blade teeth 31 are tapered so as to define a common apex when viewed from the side of the head 11.

Within opposing surfaces of the head 11 there are spring loaded balls 35 which bear against the outer surfaces of the blades 30 to prevent the blades from vibrating when they become worn. The balls 35 are received in drilled holes 36 having springs 37 therein, and the outer peripheries of which holes are peened to hold the balls in place.

The circular blades 30 are oscillated relative to each other by reason of engagement of the cams 25 in cam slots 38 in the rear edges of the blades.

In view of the foregoing, it will be apparent that the described skinning knife is capable of smooth operation even though partially worn, and that the same may be readily opened and closed for cleaning and lubricating.

The invention is not limited to the exemplary construction herein shown and described, but may be made in many ways within the scope of the appended claims.

What is claimed is:

1. In a skinning knife including a head portion and a handle portion, said head portion and handle portion being longitudinally divided to provide coinciding head portion halves and handle portion halves, the opposing sides of said head portion halves having continuous uninterrupted outer surfaces and the inner faces of said head portion halves having aligned bearing receiving recesses therein and blade receiving recesses therearound, both of which are confined within said outer surfaces of said head portion halves, the ends of said head portion halves opposite their respective handle portion halves being arcuate about the axial center of said aligned bearing receiving recesses, the outer surfaces of said head portion halves being inwardly tapered at the arcuate ends thereof, a cylindrical bearing, the ends of which are received in said bearing receiving recesses and confined within the outer side surfaces of said head portion halves, circular knife blades rotatably mounted adjacent each other on said cylindrical bearing and receiving within said bearing receiving recesses, the peripheries of said circular knife blades extending beyond said arcuate edges of said head portion halves, means located to one side of and outwardly of the contour of said bearing receiving recesses for securing said head portion halves together without penetration of said continuous uninterrupted outer surfaces of said head portion halves at locations within the contour of said bearing receiving recesses, and means extending through said handle portion halves and operably connected with said circular knife blades for oscillating the same relative to each other.

2. A skinning knife as defined in claim 1, including spring loaded pressure means lying in recesses in the inner surfaces of said head portion halves and within the continuous uninterrupted outer surfaces of said head portion halves and bearing against the outer surfaces of said blades in a direction to continuously force said blades toward each other.

References Cited in the file of this patent

UNITED STATES PATENTS 1,945,247    Wezel _____ Jan. 30, 1934

FOREIGN PATENTS 724,387    Great Britain _____ Feb. 16, 1955